(12) United States Patent
Ballinger et al.

(10) Patent No.: US 7,967,487 B2
(45) Date of Patent: Jun. 28, 2011

(54) LAMP FOR MOTOR VEHICLES

(75) Inventors: David Ballinger, Worcester (GB);
Simon Andrew Whorlow, Kenilworth (GB)

(73) Assignee: Jaguar Cars Limited, Whitley, Coventry (GB)

( * ) Notice: Subject to any disclaimer, the term of this patent is extended or adjusted under 35 U.S.C. 154(b) by 53 days.

(21) Appl. No.: 12/197,569

(22) Filed: Aug. 25, 2008

(65) Prior Publication Data
US 2009/0052201 A1   Feb. 26, 2009

(30) Foreign Application Priority Data
Aug. 24, 2007 (GB) .................................. 0716517.8

(51) Int. Cl.
*B60Q 1/00* (2006.01)
*F21V 15/01* (2006.01)
(52) U.S. Cl. ........................................ 362/546; 362/368
(58) Field of Classification Search .................. 362/546, 362/549, 523, 548, 506, 507, 368; 24/290, 24/457, 519, 520, 629, 633; 16/254, 257, 258
See application file for complete search history.

(56) References Cited

U.S. PATENT DOCUMENTS

| | | | |
|---|---|---|---|
| 4,318,161 A | 3/1982 | Shanks | |
| 4,825,515 A * | 5/1989 | Wolterstorff, Jr. | 24/625 |
| 4,965,703 A | 10/1990 | Whalen | |
| 4,994,942 A * | 2/1991 | Georgeff | 362/549 |
| 5,660,456 A | 8/1997 | Shinkai et al. | |
| 6,019,487 A | 2/2000 | Fornell | |
| 6,332,697 B2 * | 12/2001 | Soga et al. | 362/368 |
| 7,252,422 B2 * | 8/2007 | Kim | 362/549 |
| 2006/0007694 A1 | 1/2006 | Kim | |

FOREIGN PATENT DOCUMENTS

| | | |
|---|---|---|
| GB | 1 372 359 A | 10/1974 |
| GB | 2 088 543 A | 6/1982 |

* cited by examiner

*Primary Examiner* — David R Crowe
(74) *Attorney, Agent, or Firm* — Brooks Kushman P.C.

(57) ABSTRACT

A lamp assembly for a motor vehicle includes a housing receiving at least one light source. The housing includes a covering pane and including first and second fixing arrangement for releasably securing the lamp to the vehicle.

17 Claims, 2 Drawing Sheets

LAMP FOR MOTOR VEHICLES

BACKGROUND OF THE INVENTION

1. Field of the Invention

This invention relates to a lamp assembly for a motor vehicle.

2. Background Art

A motor vehicle rear lamp typically includes a housing containing one or more light sources, which is closed by a colored transparent covering pane. The lamp is usually mounted within the trunk or boot region of the vehicle and fixed to the vehicle's bodywork, with the covering pane lying flush with the vehicle's exterior surface.

In order to be able to replace any of the light sources, as necessary, access holes may be provided in the housing. Light source replacement may be possible by gaining access from inside the trunk. Alternatively, it may be necessary to release the entire lamp from the vehicle. This latter option requires access to all the fixing points of the lamp. However, this may not be possible subsequent to manufacture of the vehicle due to the presence of other vehicle components or trim. Hence the provision of a lamp which can be easily detached from and replaced into the vehicle body would be advantageous.

SUMMARY OF THE INVENTION

The present invention comprises a lamp assembly for a motor vehicle, the lamp assembly comprising an elongate trough-shaped housing for containing at least one light source and being closed by a covering pane and including first and second fixing means, located proximate opposite ends of said housing respectively, for releasably securing the lamp to the vehicle, wherein said second fixing means comprises two interlocking parts, detachable from one another.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
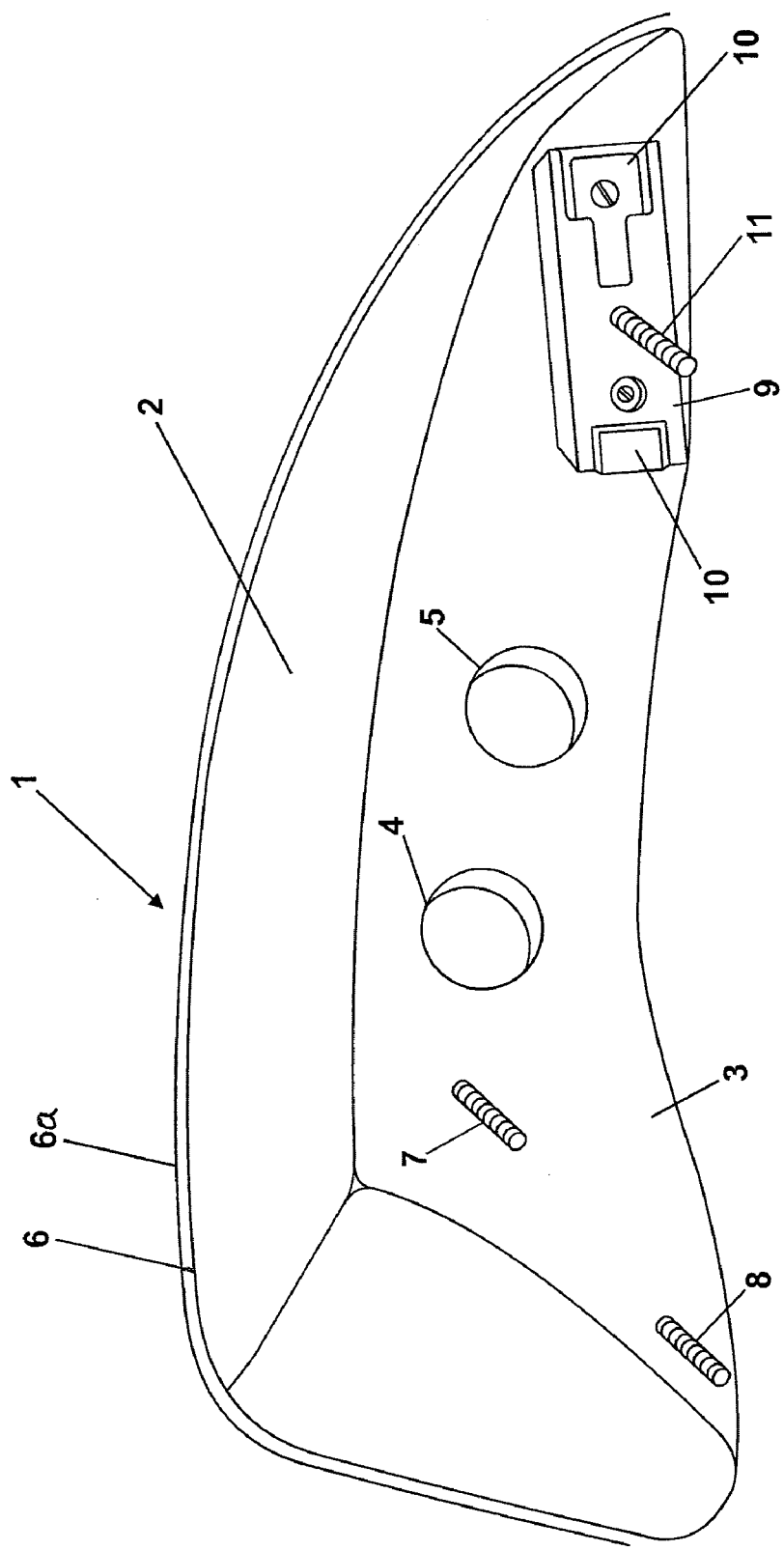
FIG. 1 is a perspective view of a motor vehicle lamp assembly in accordance with an embodiment of the invention.

With reference now to the Figures, a lamp assembly for a motor vehicle is illustrated in accordance with the present invention. FIG. 1 illustrates a lamp 1 suitable for mounting at the rear of a motor vehicle. Lamp assembly 1 include a housing 2 having an inner face 3 and an outer face 6. Housing 2 may be configured to a variety of sizes and configurations using various materials. In one exemplary embodiment, housing 2 is formed from a plastics material in a trough-shaped configuration.

One or more orifices may be formed in the inner face 3 of the housing 2. As illustrated in the Figures, the inner face 3 may include a pair of orifices 4, 5 configured to receive at least one light source, such as one or more light emitting devices, light bulbs or the like. The outer face 6 of housing 2 may include a covering pane 6a. The covering pane 6a may be formed as a transparent perspex covering pane and configured to cooperate with the outer face 6 of the housing 2 of the lamp assembly 1 such that the pane is sealed to the open face of the housing 2.

Lamp assembly 1 may be affixed or secured to a portion of the motor vehicle, such as the rear bodywork of the vehicle by a variety of methods, including mechanical attachment, adhesives and the like. In one embodiment illustrated in the Figures, a mechanical attachment or fixing arrangement may be located at each end of the housing 2. The first or inboard fixing arrangement may include one or more bolts 7, 8 which may be inserted into two corresponding holes in the vehicle's bodywork and secured therein by receiving members, such as nuts or the like.

A second or outboard fixing arrangement may include a fixing means or one or more interlocking parts 9, 10. In one embodiment illustrated in the Figures, a pair of interlocking parts are provided for use with the assembly. A first part 9 carries a bolt 11 which can be inserted into a corresponding hole in a surface of the vehicle's bodywork and secured therein by a nut. The two interlocking parts 9, 10 may be formed from various materials, such as metals, plastics or the like, and cooperate to form a snap-fastener that can be detachable from one another.

In one exemplary embodiment, when the lamp assembly is first fitted to the vehicle during manufacture, the interlocking parts 9, 10 may be joined together. The interlocking parts in this example are mechanically attached to each other by snap fastened together. The lamp assembly may then be secured to the a surface of the motor vehicle, such as the vehicle's bodywork by means of the one or more bolts 7, 8, 11. This method of attachment ensures the mechanical security of the lamp within the vehicle. After manufacture, when the lamp needs to be removed and replaced for the purpose of replacing the light source, the provision of the outboard fixing arrangement 9, 10 allows ease of removal and ensures that the lamp is returned to its correct position within the bodywork.

The lamp assembly of the present invention is illustrated in the Figures. In order to gain access to the one or more light sources in the lamp assembly the nuts securing the inboard fixing arrangement 7, 8 are removed. The inboard part of the lamp assembly 1 may be eased away from the vehicle's bodywork by rotating the lamp slightly. If the lamp assembly 1 is still connected to the vehicle by the bolt 11, the lamp 1 will tend to pivot about this outboard fixing point, slightly compressing and pre-loading the snap-fastener 9, 10. A subsequent lateral movement away from the vehicle will force the interlocking parts 9, 10 apart, thereby releasing the lamp 1 from the vehicle. The first interlocking part 9 (which carries the bolt 11) remains on the vehicle and the second interlocking part 10 remains on the lamp assembly 1.

Access to the lamp assembly may be possible from the exterior of the vehicle. To replace the lamp assembly 1, the interlocking parts 9, 10 may be aligned and the lamp assembly pushed towards the vehicle until the two parts 9, 10 snap securely together. The bolts 7, 8 are then re-located into their corresponding holes and their nuts are tightened. Hence, the lamp 1 can be removed without having to gain access to the outboard fixing bolt 11.

Figure 2A:
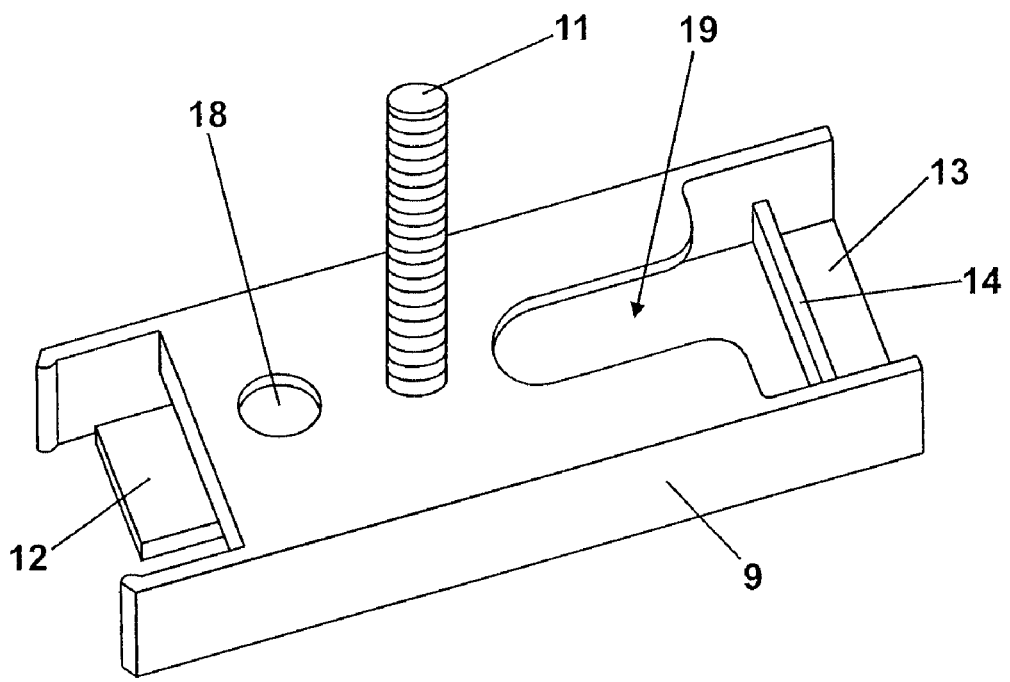
FIG. 2A is a perspective view of interlocking parts forming a fixing arrangement comprising a part of the motor vehicle lamp assembly.
Figure 2B:
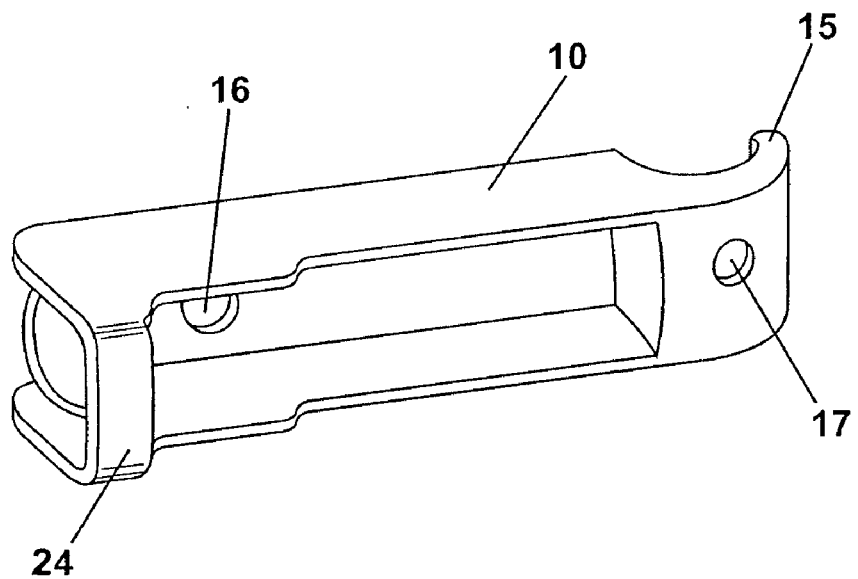
FIG. 2B is another perspective view of interlocking parts forming a fixing arrangement comprising a part of the motor vehicle lamp assembly.

With reference to FIGS. 2A and 2B, the one or more interlocking parts 9, 10 of the lamp assembly are illustrated and described in greater detail. First interlocking part 9 is illustrated in FIG. 2*a*. The first interlocking part 9 of the two interlocking parts which form the outboard fixing arrangement may be formed from as a molded plastic member that may be generally rectangular in shape and incorporating a locating tongue 12 at a proximal end of the first interlocking part 9. It is understood that the materials and shapes used with the first interlocking part may be altered based on design and engineering choices while accomplishing the same objectives.

A cross beam 13 incorporating a ridge 14 maybe formed at a distal end of the first interlocking part 9. A mechanical securement member 11, such as a threaded bolt or the like may be received in a central region of the first interlocking part 9.

The second interlocking part 10 of the two interlocking parts which form the outboard fixing arrangement may be formed from as a molded plastic member that may be generally rectangular in shape. It is understood that the materials and shapes used with the first interlocking part may be altered based on design and engineering choices while accomplishing the same objectives. It is also contemplated that the second interconnecting part may be formed as part of the housing rather than comprising a separate item.

A lip 24 may be formed at a proximal end of the second interlocking part 10. Lip 24 may be configured to be received by tongue 12 on the first interlocking part 9 such that the lip 24 slides underneath the tongue 12 when the two parts 9, 10 are connected. A ridge 15 may be formed at a distal end of the second interlocking part 10 that engages or snaps over the ridge 14 of the first interlocking part 9 during connection and disconnection of the two parts 9, 10 to provide a mechanical attachment between the members.

One or more apertures, such as through holes 16, 17 may be provided in the second interlocking part 10 to receive fixing screws so that the part 10 can be secured to the housing 2. As illustrated in FIG. 2*a*, first interlocking part 9 includes a corresponding through hole 18 and cut-out portion 19 to permit access to the fixing screws so that the two parts (once snapped together) can be fitted to the housing 2 as a single unit, if desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An arrangement for releasably securing a lamp assembly to a motor vehicle comprising:
a first fixing member cooperating with an inner face of a housing of the lamp assembly; and
a second fixing member including first interlocking part securable to the motor vehicle and a second interlocking part securable to the housing of the lamp assembly, the first and second interlocking parts each having proximal and distal ends, the second interlocking part configured to releasably engage the first interlocking part at both the proximal and distal ends thereof to secure the lamp assembly to the motor vehicle, wherein the first interlocking part includes a locating tongue at the proximal end and a cross beam incorporating a ridge at the distal end, and wherein the second interlocking part includes a lip at the proximal end to engage the locating tongue of the first interlocking part and a ridge at the distal end to engage the ridge of the first interlocking part.

2. The arrangement of claim 1 wherein the first and second fixing members are located at proximate opposite ends of the housing.

3. The arrangement of claim 1 wherein said first and second fixing members each incorporate threaded bolts.

4. The arrangement of claim 1 wherein the second interlocking part of the second fixing member is formed as part of the housing.

5. A lamp assembly for a motor vehicle, the lamp assembly comprising an elongate trough-shaped housing for containing at least one light source and being closed by a covering pane and including first and second fixing means, located proximate opposite ends of said housing respectively, for releasably securing the lamp to the vehicle, wherein said second fixing means comprises two interlocking parts, detachable from one another, the two interlocking parts comprising a first interlocking part and a second interlocking part each having proximal and distal ends, wherein the first and second interlocking parts mechanically attach to each other at both the proximal and distal ends, wherein the first interlocking part includes a locating tongue at the proximal end and a cross beam incorporating a ridge at the distal end, and wherein the second interlocking part includes a lip at the proximal end to engage the locating tongue of the first interlocking part and a ridge at the distal end to engage the ridge of the first interlocking part.

6. The lamp assembly of claim 5 wherein the interlocking, detachable parts include a snap fastening arrangement.

7. The lamp assembly of claim 5 wherein the interlocking, detachable parts are made from plastics.

8. The lamp assembly of claim 5 wherein said first and second fixing means incorporate threaded bolts.

9. The lamp assembly of claim 5 wherein the second interlocking part is formed as part of the housing.

10. A lamp assembly for a motor vehicle comprising:
a housing having an inner face and an outer face;
at least one light source received within the inner face of the housing;
a first fixing arrangement cooperating with the inner face of the housing for securement to a surface of the motor vehicle for releasably securing the lamp assembly to the motor vehicle: and
a second fixing arrangement cooperating with the inner face of the housing for securement to the surface of the motor vehicle,
wherein the second fixing arrangement includes a first interlocking part securable to the motor vehicle and a second interlocking part securable to the housing, the first and second interlocking parts each having proximal and distal ends, wherein the first and second interlocking parts releasably engage each other at both the proximal and distal ends thereof to secure the lamp assembly to the motor vehicle, wherein the first interlocking part includes a locating tongue at the proximal end and a cross beam incorporating a ridge at the distal end, and wherein the second interlocking part includes a lip at the proximal end to engage the locating tongue of the first interlocking part and a ridge at the distal end to engage the ridge of the first interlocking part.

11. The lamp assembly of claim 10 wherein the housing is formed as an elongate trough-shaped member.

12. The lamp assembly of claim 10 further comprising a covering pane configurable to be secured to the outer face of the housing.

13. The lamp assembly of claim 10 wherein the first and second fixing arrangements are located at proximate opposite ends of the housing.

14. The lamp assembly of claim 10 wherein the first and second interlocking parts of the second fixing arrangement are securable by a snap fastening arrangement.

15. The lamp assembly of claim 10 wherein the first and second interlocking parts of the second fixing arrangement are made from plastics.

16. The lamp assembly of claim 10 wherein said first and second fixing arrangements each incorporate threaded bolts.

17. The lamp assembly of claim 10 wherein the second interlocking part of the second fixing arrangement is formed as part of the housing.

* * * * *